(12) United States Patent
Fuse et al.

(10) Patent No.: US 7,399,180 B2
(45) Date of Patent: Jul. 15, 2008

(54) BRAZING FURNACE

(75) Inventors: Masashi Fuse, Aichi-ken (JP); Hidetaka Ikita, Kariya (JP); Yoshitomi Andou, Obu (JP); Mikio Takikawa, Kariya (JP); Kiyoshi Kobayashi, Chigasaki (JP)

(73) Assignees: Kanto Yakin Kogyo Kabushiki Kaisha, Kanagawa-Ken (JP); Denso Corporation, Aichi (JP)

( * ) Notice: Subject to any disclaimer, the term of this patent is extended or adjusted under 35 U.S.C. 154(b) by 19 days.

(21) Appl. No.: 11/443,033

(22) Filed: May 31, 2006

(65) Prior Publication Data

US 2006/0292516 A1 Dec. 28, 2006

(30) Foreign Application Priority Data

Jun. 2, 2005 (JP) ............................. 2005-162102

(51) Int. Cl.
*F27B 9/02* (2006.01)
(52) U.S. Cl. ...................................................... 432/128
(58) Field of Classification Search ................. 432/128, 432/171, 121
See application file for complete search history.

(56) References Cited

U.S. PATENT DOCUMENTS

| | | | | |
|---|---|---|---|---|
| 3,778,221 A | * | 12/1973 | Bloom | 432/11 |
| 3,982,887 A | * | 9/1976 | Kendziora et al. | 432/128 |
| 4,586,898 A | * | 5/1986 | Orbeck | 432/122 |
| 4,886,449 A | * | 12/1989 | Brittin | 432/121 |
| 5,006,063 A | * | 4/1991 | Poggi et al. | 432/121 |
| 5,660,543 A | * | 8/1997 | Marks et al. | 432/152 |
| 7,090,488 B2 | * | 8/2006 | Murakami et al. | 432/128 |

* cited by examiner

*Primary Examiner*—Gregory A Wilson
(74) *Attorney, Agent, or Firm*—Shlesinger, Arkwright & Garvey LLP

(57) ABSTRACT

The object of this invention is to have shorter sealing chambers (preheating chamber and gradual cooling chamber) located before and after the brazing atmospheric chamber, to make higher sealing of the atmosphere, and to prevent the scratch caused by the conventional curtains made of metal or others. In order for that, the structures made of steel or graphite are installed standing perpendicular to the moving direction on the conveyor belt which is circulating through the atmospheric furnace. And the bendable or flexible sealing materials are installed on the ceiling and on the right and left side walls of the sealing chambers (preheating chamber and gradual cooling chamber), which are located before and after the atmospheric furnace, into the above two chambers, and making these bendable or flexible sealing materials have rubbing contact with the above mentioned structures.

6 Claims, 4 Drawing Sheets

BRAZING FURNACE

FIELD OF THE INVENTION

This invention relates to a type of brazing atmospheric furnace to which atmospheric gas constantly fed, for example, from the water cooling chamber, and through the tunnel of which the conveyer belt is driven in circulation.

BACKGROUND OF THE INVENTION

This type of atmospheric furnace is used for brazing of aluminum material to be heated. In this case how to keep good atmosphere in the furnace is important. Conventionally furnace atmosphere brought in to the heating chamber of the furnace through the water cooling chamber etc. is maintained with the sealing chambers like the preheating chamber or the gradual cooling chamber.

These sealing chambers have to be placed before and after the furnace. One of the sealing chambers is located at the entrance of the material to be heated and the other sealing chamber is located at the exit. The sealing chambers have to permit the material to be heated go through and at the same time have to maintain the furnace atmosphere. Consequently the sealing chambers have to have long length. Actually more than one metallic curtains etc. to cover every opening of the sealing chambers were the only solution.

OBJECTS AND SUMMARY OF THE INVENTION

The objects of this invention is to have shorter sealing chambers which are located before and after the atmospheric furnace and to prevent the scratch on the materials to be heated caused by the metallic curtains. Another object of this invention is to avoid the tools to hold the materials to be heated on the conveyer belt.

This invention is applied to the brazing atmospheric furnace system which consists of the preheating chamber to preheat the materials to be heated, the heating chamber to heat up and braze the preheated materials, the gradual cooling chamber to cool down the materials heated in the heating chamber. This system also consists of the belt conveyor to carry the materials to be heated mentioned above through the preheating chamber, the heating chamber and the gradual cooling chamber mentioned above. And all the chambers of this system mentioned above are filled up with the atmospheric gas. This invention relates to this type of atmospheric furnace system characteristic in having the bendable or flexible sealing materials in the preheating chamber and in the gradual cooling chamber to prevent the outflow of atmospheric gas. Also this system has the proper number of structures throughout the belt conveyor on appropriate intervals, where the materials to be heated are placed properly so that the structures mentioned above can make the rubbing contact with the bendable sealing materials mentioned above while the conveyer belt is moved.

In this invention length of the sealing chambers can be reduced to about the half because atmospheric gas (nitrogen) consumption becomes half of the conventional system (for example 30 m³/hour becomes 15 m³/hour). And the work to install the tool to the materials to be heated becomes unnecessary because the tool itself is not needed.

Also it is not necessary to heat up the heavy tools, which saves energy, and scratches on the materials to be heated by the conventional metallic curtains are avoided.

EXPLANATION OF NUMBERS

1—Material to be heated (such as aluminum heat exchanger)
2—Rotating unit
3—Preheating chamber (Sealing chamber)
4—Heating chamber
5—Water cooling chamber
6—Gradual cooling chamber (Sealing chamber)
7—Belt driving unit
8—Continuous atmospheric furnace
9—Conveyor belt
10—Interval between structures
11—Moving direction of belt
12—Structure
13—Cylinder type opening (Tunnel type room)
14—Bendable (flexible) sealing material

DETAILED DESCRIPTION OF THE INVENTION

Figure 1:
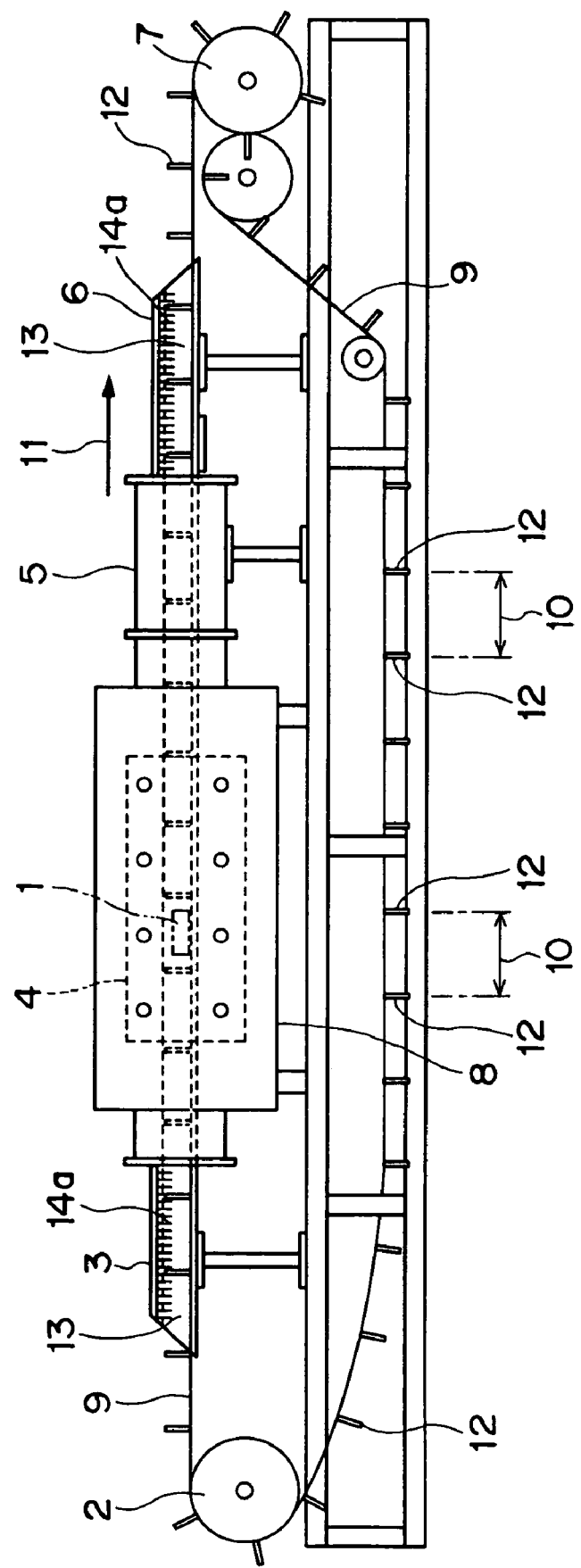
FIG. 1 is the side explanatory view of the continuous atmospheric furnace system appropriate for realization of this invention.
Figure 2:
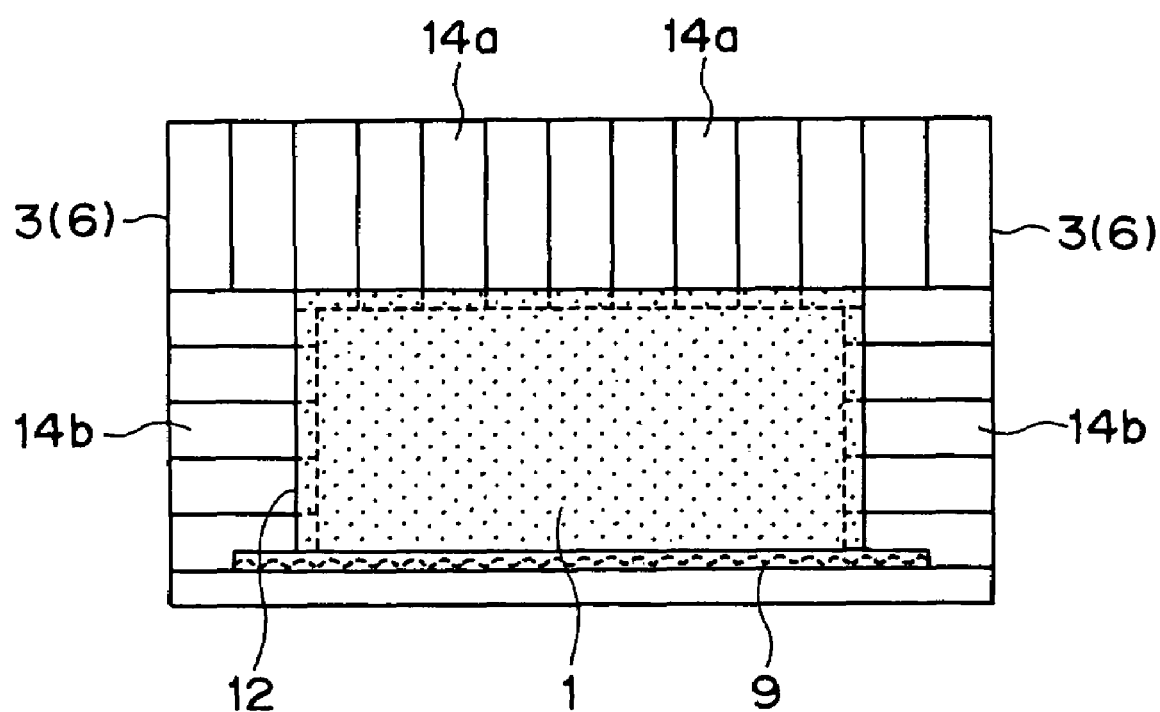
FIG. 2 is the cross sectional explanatory view of the structures on the conveyer belt and the bendable sealing materials which can make rubbing contact with the structures in the sealing chambers (the preheating chamber and the gradual cooling chamber) which are located before and after the atmospheric furnace. These structures and bendable sealing materials are used in this invention.

FIG. 1 is the explanatory side view of the continuous brazing atmospheric furnace system and FIG. 2 is the front view of the preheating chamber (and also of the gradual cooling chamber) from the exit side.

In FIG. 1, 1 is the material to be heated such as aluminum heat exchanger and the part to be brazed of this aluminum heat exchanger is coated with the flux composing of fluorine compound of 540° C. melting point and the solder of 585° C. melting point. 9 is the conveyor belt carrying the material to be heated and is made of, for example, steel or graphite.

As shown in FIG. 1 continuous atmospheric furnace system 8 composes of rotating unit 2, preheating chamber (sealing chamber) 3, heating chamber 4, water cooling chamber 5, gradual cooling chamber (sealing chamber) 6 and belt driving unit 7 in the direction of the material to be heated 1 is carried (Arrow 11 in FIG. 1 indicates). Preheating chamber 3, heating chamber 4, water cooling chamber 5 and gradual cooling chamber 6 are filled up with nitrogen gas, atmospheric gas, and conveyor belt 9 runs through these chambers.

Conveyor belt 9 is circulated to carry the material to be heated from preheating chamber 3 through gradual cooling chamber 6 by rotating unit 2 and belt driving unit 7.

On the conveyor belt 9 a lot of square structures 12, made of preferably same material as belt (such as steel or graphite), are fixed standing perpendicular to the belt moving direction 11 in the designed interval. These structures 12 are taller and wider than the material to be heated 1 and fixed standing throughout the conveyor belt in the designed interval 10 corresponding to the size of the materials to be heated.

In the cylinder type opening (tunnel type room) 13 of the preheating chamber 3 and the cylinder type opening (tunnel type room) 13 of the gradual cooling chamber 6, thin metallic bendable sealing materials 14a are hung down from the ceiling of preheating chamber 3 and gradual cooling chamber 6. At the same time bendable sealing materials 14b, made of same material as 14a, are installed on the side wall of the preheating chamber 3 and gradual cooling chamber 6 toward the cylinder type openings 13 of the preheating chamber 3 and gradual cooling chamber 6.

These thin bendable (flexible) sealing materials 14a and 14b comprise metallic plate or foils, 0.05 to 0.1 mm thick, made of stainless steel, nickel or nickel alloy, and these materials 14a and 14b are installed as they can make rubbing contact with the structures 12 which are standing on the belt 9 and moving together with the belt 9 so that minimizing the leak of the atmospheric gas in the furnace to outside.

Figure 3:
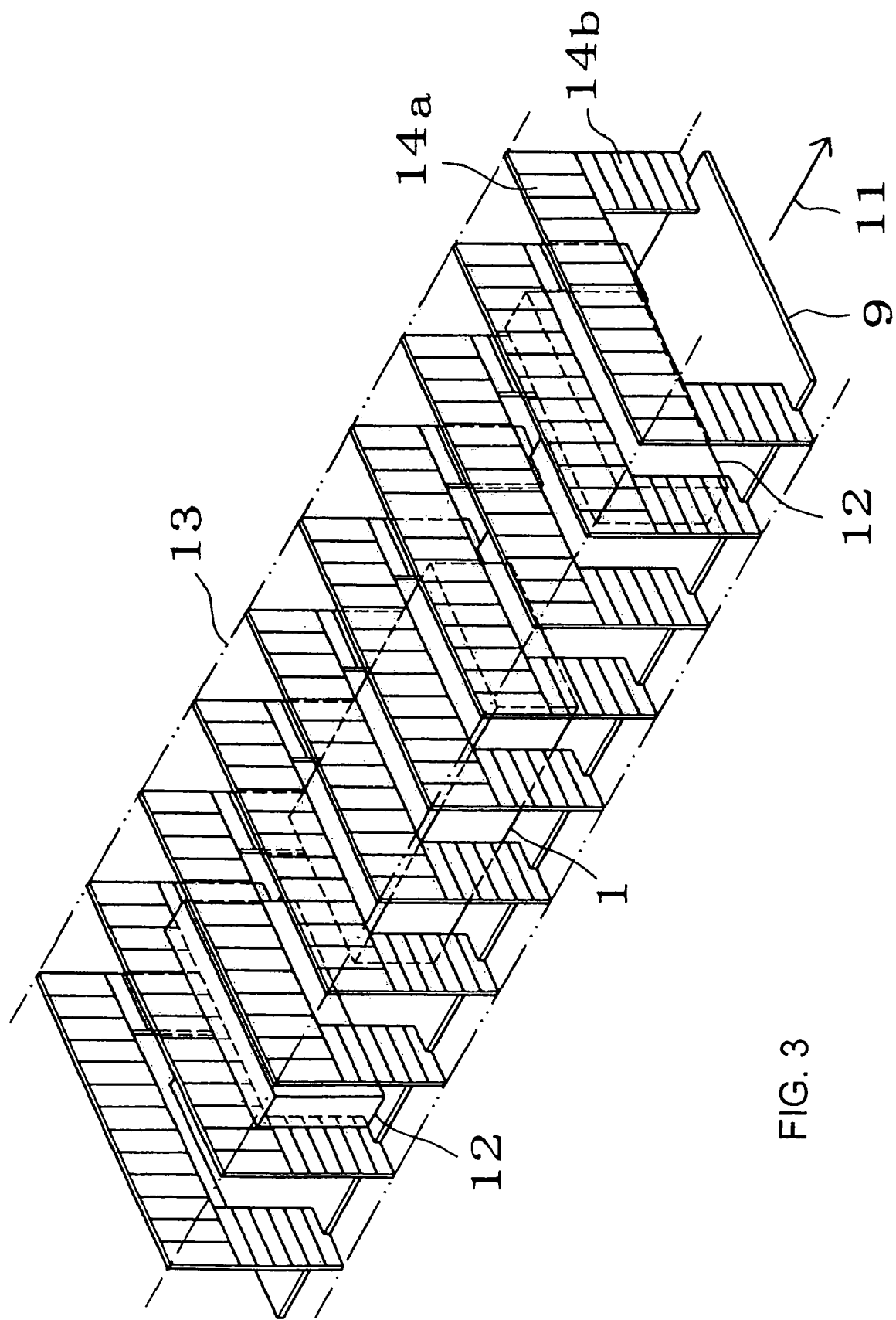
FIG. 3 is the perspective explanatory view of the bendable (flexible) sealing materials installed on the ceiling and sidewalls in case of the same position in the preheating chamber and the cooling chamber for realization of this invention.
Figure 4:
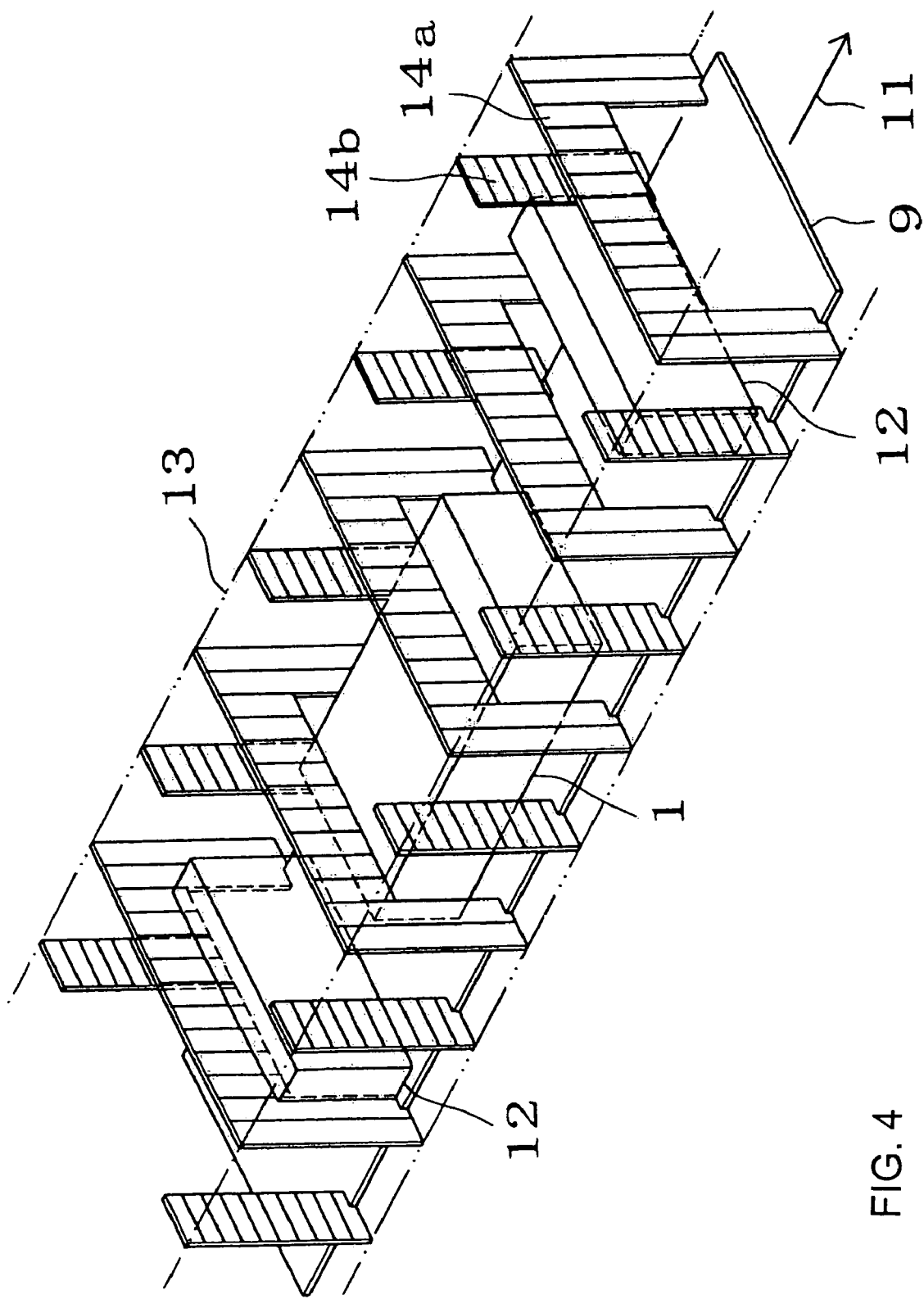
FIG. 4 is the perspective explanatory view of the bendable (flexible) sealing materials installed on the ceiling and sidewalls in case of the alternate position in the preheating chamber and the cooling chamber for realization of this invention.

These bendable sealing materials 14a and 14b are installed on the ceiling and the side wall of preheating chamber 3 and gradual cooling chamber 6 toward the center of the cylinder type openings of these two chambers. They are installed on the same position in the designed interval in the longer length direction (moving direction of the belt 9) throughout these two chambers as shown in FIG. 3. Or the bendable sealing materials 14a on the ceiling of the chambers and the bendable sealing materials 14b on the side wall of the chambers are installed alternately in the designed interval as shown in FIG. 4.

The materials to be heated are placed on the position 10 between two structures 12 standing on the belt 9 without using any tools and are carried into the continuous atmospheric furnace 8. The length 10 between two structures 12 is pretty much longer than the length of the material to be heated 1, and the structures 12 is taller than the material to be heated 1. Consequently it is possible to avoid the scratches caused by the contact between the materials to be heated 1 and the bendable sealing materials 14a and 14b while moving in the system.

It is possible to maintain the furnace atmosphere in the continuous atmospheric furnace 8 by rubbing contact between the structures 12 on the belt 9 and the bendable sealing materials 14a and 14b. Consequently, although making the length of the preheating chamber 3 and the gradual cooling chamber 6 about the half and reducing the gas consumption from 30 m$^3$/hour to 15 m$^3$/hour, the good brazing can be attained same as the conventional brazing plant.

Although the structure 12 on the belt 9 is taller than the material to be heated 1 in the example mentioned above, the structure 12 can be lower than the material to be heated 1, when the space between the structure 12 and the material to be heated 1 is good enough.

This invention can be applied not only to the continuous atmospheric furnace system but also to the intermittent type furnace system.

The materials mentioned in the example for the material to be heated 1, conveyor belt 9, structure 12 and bendable sealing material 14 are merely the appropriate examples for realizing this invention and this invention can not be limited to these examples.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. An atmospheric brazing furnace system, comprising:
   a) a preheating chamber for preheating materials to be heated,
   b) a heating chamber for heating and brazing preheated materials to be heated,
   c) a cooling chamber for cooling heated materials,
   d) a conveyor for carrying materials to be heated in a direction of movement through the preheating chamber, the heating chamber, and the cooling chamber,
   e) bendable or flexible sealing materials being installed in the preheating chamber and the cooling chamber,
   f) a plurality of structures being installed on and fixed to the conveyor at predetermined intervals, the predetermined intervals being at a distance on the conveyor where the materials to be heated are placed, and
   g) said structures being arranged so as to make a sliding contact with the sealing materials in order to prevent a leaking of atmospheric gas from said chambers.

2. An atmospheric brazing furnace system as in claim 1, wherein:
   a) said structures are plates which are taller and wider than the materials to be heated, and the structures are made of steel or graphite, and
   b) a lot of these structures are standing on the conveyor belt perpendicular to the direction of movement of the conveyor at the predetermined intervals, and
   c) the plates are taller and wider than the materials to be heated to avoid scratches caused by contact between materials to be heated and the bendable or flexible sealing materials while the materials to be heated are moving in the direction of movement.

3. An atmospheric brazing furnace system as in claim 2, wherein:
   a) the cooling chamber includes a gradual cooling chamber,
   b) the preheating chamber and the gradual cooling chamber each have a ceiling and right and left side walls, and
   c) the bendable or flexible sealing materials are provided on the ceiling and on the right and left side walls of the preheating chamber and the gradual cooling chamber, and are installed in the same position in the longer length direction, or they are installed in an alternate position, along the direction of movement of the conveyor.

4. An atmospheric brazing furnace system as in claim 3, wherein:
   a) said bendable or flexible sealing materials include thin metallic thin plate or foils, 0.05 to 0.1 mm thick, made of stainless steel, nickel or nickel alloy.

5. An atmospheric brazing furnace system as in claim 2, wherein:
   a) said bendable or flexible sealing materials include thin metallic thin plate or foils, 0.05 to 0.1 mm thick, made of stainless steel, nickel or nickel alloy.

6. An atmospheric brazing furnace system as in claim 1, wherein:
   a) the conveyor belt is a single conveyor belt which carries materials to be heated through the preheating chamber, through the heating chamber, and through the cooling chamber.

* * * * *